Apr. 17, 1923.

R. HODGSON 1,452,047

SAFETY PLUG FOR WATER TUBE BOILERS

Filed Oct. 28, 1920

WITNESS
Gustav Genzlinger

INVENTOR.
Raymond Hodgson
BY
Francis Chamber
ATTORNEY.

Patented Apr. 17, 1923.

1,452,047

UNITED STATES PATENT OFFICE.

RAYMOND HODGSON, OF FREEPORT, NEW YORK.

SAFETY PLUG FOR WATER-TUBE BOILERS.

Application filed October 28, 1920. Serial No. 420,091.

*To all whom it may concern:*

Be it known that I, RAYMOND HODGSON, a citizen of the United States of America, and resident of Freeport, in the county of Nassau, in the State of New York, have invented a certain new and useful Improvement in Safety Plugs for Water-Tube Boilers, of which the following is a true and exact description, reference being had to the accompanying drawings, which form a part thereof.

My invention relates to a device for plugging tubes of water tube boilers said device being intended to be used in the case of a burst or leaking tube. The object of my invention is to provide for the firm plugging of such a tube by a device which is readily applied and which will permit of adjustment when necessary without requireing the boiler to be blown out.

The nature of my device will be best understood as described in connection with the drawings in which it is illustrated and in which Figure 1 is a side elevation showing my device in use in connection with a water tube boiler.

Figure 1:
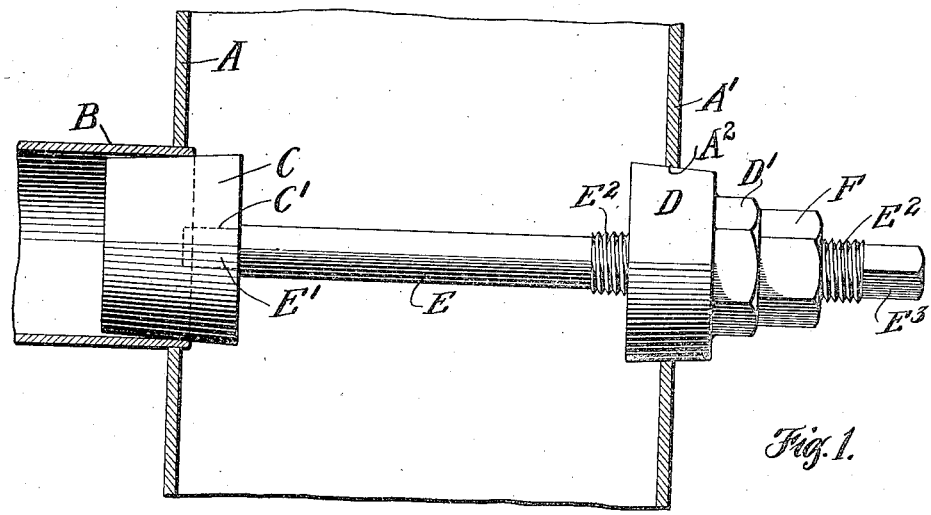
Figure 2:
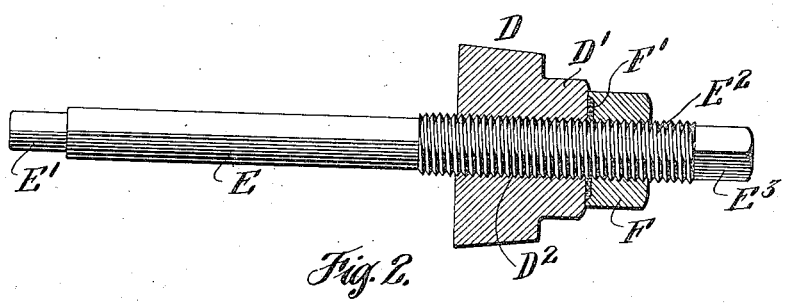
Figure 2 is a similar elevation omitting the tube plug and showing the plug which closes the hand hole and the packing holding nut in section.
Figure 3:
Figure 3 is a sectional view of the packing holding nut.
Figure 4:
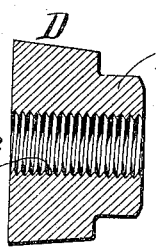
Figure 5:
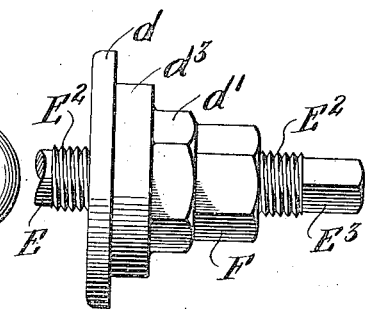

Figure 4, a sectional view of the hand hole plug showing also an eye bolt for use in bringing it into position in the hand hole, and Figure 5 is a side elevation showing a modified form of device for enclosing the hand hole and fitting an abutment over the rod which holds the tube plug in place.

A indicates the tube sheet and A' the outer wall or boiler header. B indicates one of the water tubes. C is a conical plug adapted to enter and close the end of the tube, this plug being formed perfectly with the central socket C' which may be plain or threaded. D is a plug fitting in the hand hole $A^2$ of the header wall A'. This plug is preferably formed with an external angularly faced portion D' by means of which it may be engaged by a wrench. The plug D has a threaded central perforation formed through it, as indicated at $D^2$. E is a rod having a reduced portion E' adapted to fit into the socket C' of the plug C and a threaded portion $E^2$ adapted to screw into the threaded portion $D^2$ of the plug D. The end $E^3$ of the rod is angularly faced so as to be readily engaged by a wrench. F is a packing holding nut screwing on the rod E and against the nut E' of the plug D which is preferably formed with a recessed face as indicated at F' to hold packing. G is an eye bolt to screw into the plug D, G' being the eye. $d$, Fig. 5, is a hand hole cover adapted to contact with the inner face of the wall A' the hand hole cover being, as shown, formed with a projecting portion $d^3$ which extends through the hand hole and an angularly faced portion $d'$. In other respects it is like the plug D.

In operation the plug C is inserted in the end of the tube B as shown and the hand hole plug D inserted in the hand hole $A^2$ as shown. This is conveniently done by means of the eye bolt G and a cord secured to the eye bolt which permits the plug to be pushed up from the bottom of the header and brought into the hand hole in which case, of course, the eye bolt is detached the plug D being replaced. The threaded rod E is inserted through it and screwed down until it abuts against the plug C and until by the operation of the screw the plug C and hand hole plug D are firmly seated between the tube and the hand hole. Packing is then preferably placed around the rod E and the packing nut F screwed down upon it forming a tight joint. It will be obvious that the plug C can be very firmly seated by this device and that in case, for any reason, it should cease to fit tightly in the end of the tube it can be readily tightened by turning the threaded rod without requiring the boiler to be blown out.

Having now described my invention what I claim as new and desire to secure by Letters Patent, is:

A device for plugging the water tubes of water tube boilers having in combination a conical plug adapted to enter and close the end of a tube, a hand hole stopper adapted to close a hand hole on the inner side of the header, said closing means having an angularly faced wrench engaging extension formed on a portion extending through the hand hole and a central threaded perforation and a threaded rod adapted to screw through the perforation in the closing means and abut against the tube plug.

RAYMOND HODGSON.